(No Model.)　　　　　　　　　　　　　　3 Sheets—Sheet 1.
J. N. PARKER.
MACHINE FOR GRINDING MOWER AND REAPER KNIVES.
No. 287,854.　　　　　　　　　Patented Nov. 6, 1883.
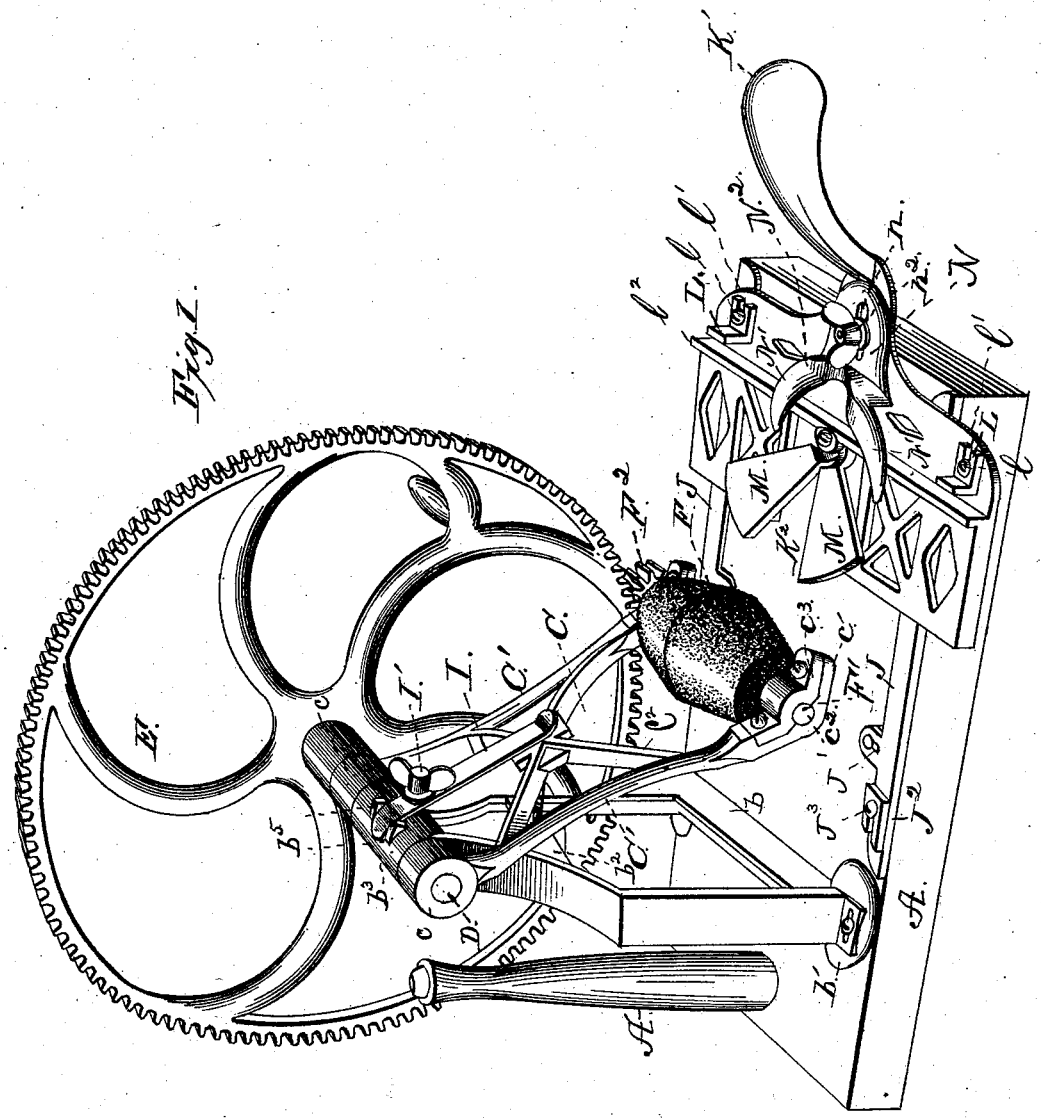
Witnesses,
N. A. Clark.
P. B. Turpin
Inventor
James N. Parker
By R. S. & A. P. Lacey
Att'ys

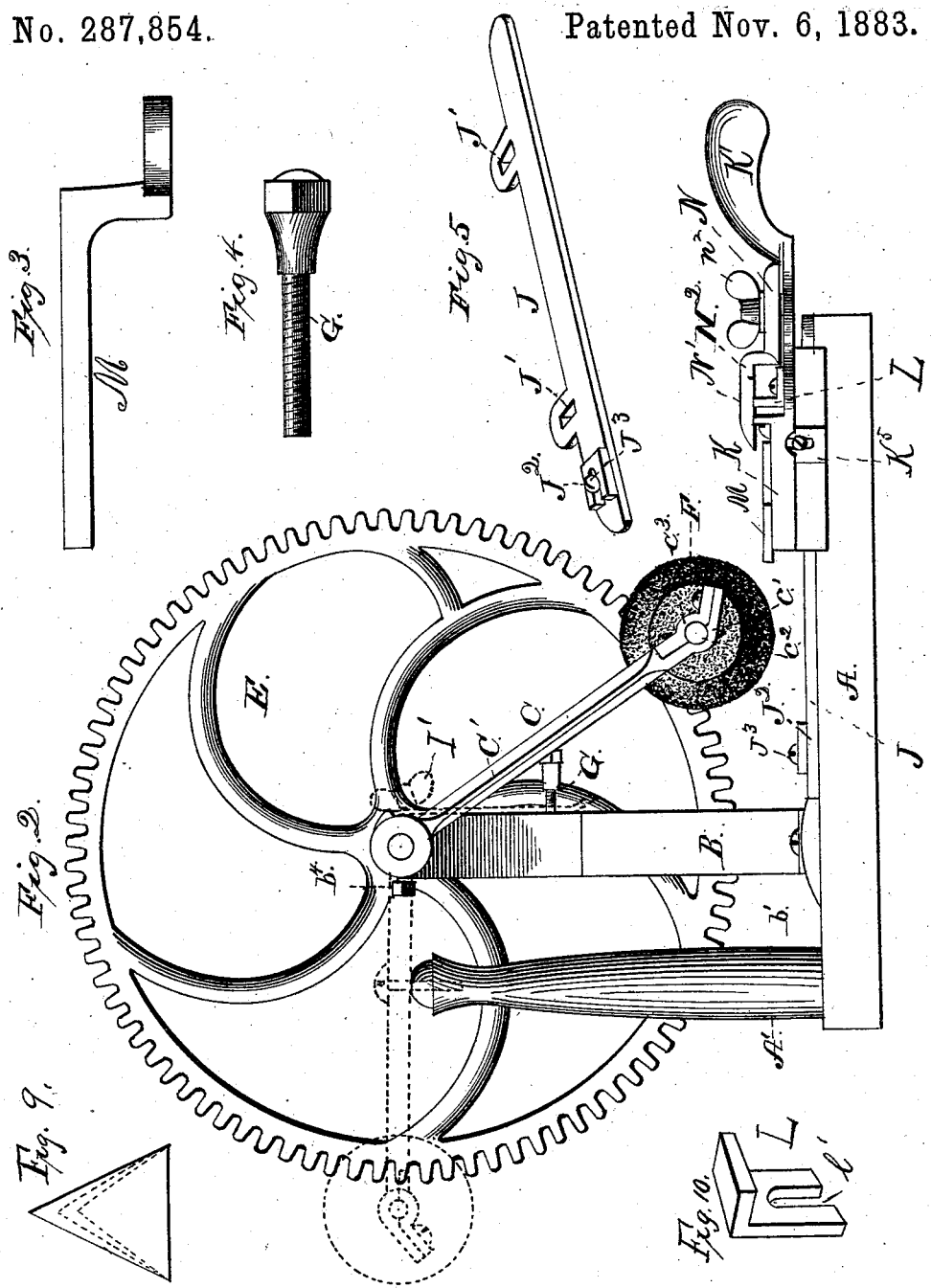

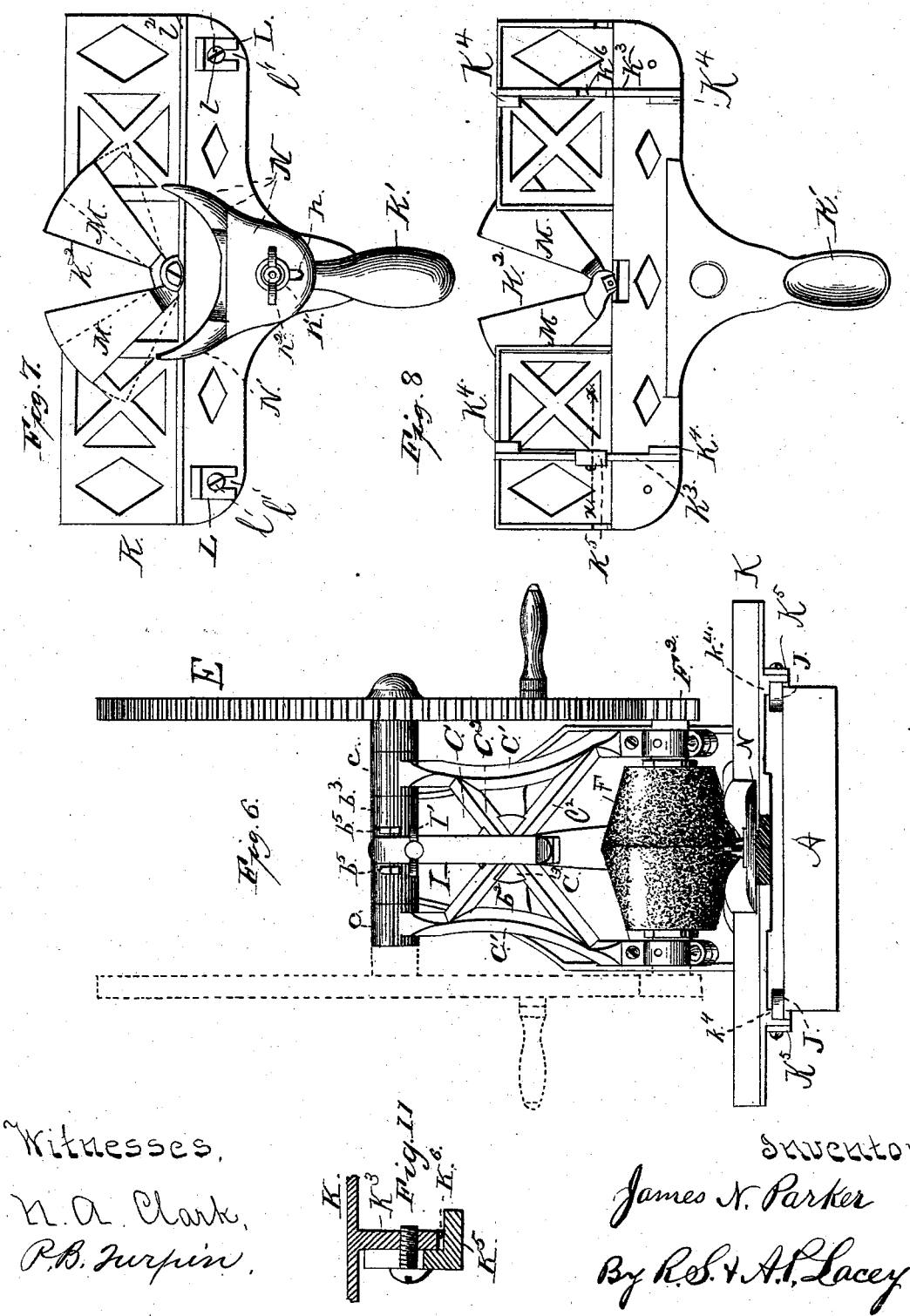

UNITED STATES PATENT OFFICE.

JAMES N. PARKER, OF ELKHART, INDIANA.

MACHINE FOR GRINDING MOWER AND REAPER KNIVES.

SPECIFICATION forming part of Letters Patent No. 287,854, dated November 6, 1883.

Application filed September 8, 1883. (No model.)

*To all whom it may concern:*

Be it known that I, JAMES N. PARKER, a citizen of the United States, residing at Elkhart, in the county of Elkhart and State of Indiana, have invented certain new and useful Improvements in Machines for Grinding Mower and Reaper Knives; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for grinding the knives of harvesters and mowers; and it consists in the construction, combination, and arrangement of the several parts, as will be hereinafter fully described and claimed.

In the drawings, Figure 1 is a perspective view of my machine. Fig. 2 is a side view of same. Fig. 3 is a side or edge view of one of the guard-plates. Fig. 4 is a detail view of the adjustable stop. Fig. 5 is a detail view of one of the rails. Fig. 6 is a front elevation of the machine. Fig. 7 is a top, and Fig. 8 is a bottom, plan view of my table, all of which will be described. Fig. 9 shows a sickle-blade. Fig. 10 shows one of the supports, and Fig. 11 is a detached sectional view on line $x\,x$, Fig. 8. The detail views 3, 4, 5, 7, 8, and 10 are made on an enlarged scale, to better illustrate the constructions represented thereby.

The base-plate A is provided at one end with the post A', which serves a support for the swinging frame when the same is thrown back, as will be described.

The standard B is bolted to the base-plate slightly in advance of the post A'. This standard is preferably constructed, as shown, with the base-bar $b$, having extended lugs $b'$, through which the bolts are placed, and it is provided with a cross-bar, $b^2$, near its upper end, as shown. The top cross-bar, $b^3$, of this standard is bored, to furnish a way for the spindle, and is provided on its rear side with a tapped opening, to receive a clamping-screw, $b^4$, which holds the spindle to its place. On the front face of this cross-bar I form two ears, $b^5\,b^5$, which prevent any lateral movement of the upper end of the pressure-spring, hereinafter described. I also form a tapped screw-opening in the front edge of this top bar, to receive the spring-retaining screw I', which is arranged slightly below the ears before described.

The swinging frame C has its side bars, C', joined midway by the cross-braces $C^2$, provided centrally with the plate $C^3$, as shown. The side bars, at the upper ends, are fitted to rest snugly on opposite sides of the top bar of the standard, and are provided with bearings $c$, having suitable openings for the spindles. The opposite ends, $c'$, of the side bars, C', are turned up slightly, so as to escape the table when the latter is pushed up in the operation of the machine. These turned-up lower ends of the side bars are provided with bearings $c^2$ for the grinding-wheel shaft, and have the removable journal-caps $c^3$, secured thereon by means of bolts or screws, as clearly shown.

The spindle D is passed through the hub of drive-wheel E, the bearings $c$ in the swinging frame, and the top bar of the standard, and is secured in place by the clamping-screw $b^4$. The wheel E is provided with gear-teeth and a suitable handle, as shown. The grinding-wheel F is provided with shaft F', journaled in bearings $c^2$ in the outer end of the swinging frame C. The shaft F' is provided with gear-pinion $F^2$, meshed with wheel E, so that the grinding-wheel is operated as the drive-wheel is revolved.

The grinding-wheel is made in the double conical form shown, to enable the grinding of both adjacent edges of adjoining blades at the same time. When the machine is to be used for general grinding, I remove the conical wheel and substitute a cylindrical one therefor and turn the frame over onto the post A', as indicated in dotted lines, Fig. 2, where it may be secured firmly by a screw driven into the head of the post, as indicated in said Fig. 2.

In order to limit the downward movement of the swinging frame C, I provide the stop G, having threaded shank turning in a suitable opening through the cross-bar $b^2$, and provided with a rubber or otherwise cushioned head, as shown. This stop may be turned and adjusted in or out to any point desired, to limit the downward movement of the swinging frame.

It will be readily understood that instead of having the adjustable stop secured to the standard, it might be secured to the under side of the swinging frame, the object being to provide an interposed stop, to limit the downward movement of the frame.

In grinding it is desirable to have a steady support for the swinging frame, in order to prevent its jolting or jarring, and thus forming an uneven or rough surface. To accomplish this I provide the spring I, having its upper end bearing between the ears $b^5$ of the top bar, and secured to the said top bar by means of an adjusting-screw, I', arranged below the ears $b^5$, as shown. This screw serves as a retaining device, and also to enable the regulation of the tension of the spring, so as to force the grinding-wheel hard down when a strong pressure thereon is desired, as is frequently the case.

Rails J J are mounted on and extend slightly over the opposite edges of the base-plate A, as shown in Figs. 1 and 6. I preferably secure these rails to the base-plate by screws or bolts passed through transverse slots J', formed in the rails, as shown in Fig. 5. This is to permit the adjustment of the rails out, to take up wear on same, as will be readily understood.

Stop-blocks $J^2$ are secured, by screws $J^3$ preferably, on the rails at a point near the inner ends thereof, for the purpose of limiting the inward motion of the table, and to prevent cutting of the table consequent on its being pushed too far under the grinding or abrading wheel. These stops, it will be seen, are secured by screws on the rails, and may be adjusted to any desired point. Where so desired, they may be secured on the bed-plate, but I prefer to put them on the rails, as shown. The screws pass through elongated openings or slots, so the stops can be adjusted forward or backward at will.

The table K is provided with a suitable handle, K', and is formed in its forward edge with a central recess, $K^2$. On the under side of the table I form depending flanges $K^3$, which extend down on opposite sides of the rails J, and lugs or bearings $K^4$ are formed close to the inner edges or sides of the flanges $K^3$, and rest down on the rails J when the table is placed thereon. In order to secure the table steadily on the rails J, I provide the steadying-clamps $K^5$, which have one of their arms secured to the flanges $K^3$ by screws passed through a slot, so that they can be adjusted up or down, and the other arm thereof extends under the rails J and retains the table firmly in place, and insures a steady easy movement of the same. The horizontal arm of each of these clamps rests and is movable vertically in notches or slots $K^6$, formed in the lower edges of the flanges $K^3$, as clearly shown in Fig. 8, in which figure one of the clamps is removed, in order to better illustrate the said notch. By means of this construction the lower arm of the clamp is securely held from lateral movement, and any pivotal movement of the clamp on its retaining-screw is consequently prevented.

Supports L L are secured on the upper side of the table by screws $l$, passed through slots $l'$ formed in the horizontal arm of said supports, and the vertical arms thereof project up parallel with a shoulder or ledge, $l^2$, formed across the face of the table. This construction is for the purpose of furnishing a support or bearing for the back-bar of a harvester-knife while sharpening the same, and especially while sharpening the last few blades of the knife, when the bearing of the shoulder on the clamp, presently described, is but slight, as will be understood.

The supporting leaves or plates M are furnished to provide ample support and guides for the various angled blades of the harvester-knives. To secure this, I pivot these plates on a common bolt arranged at the base of the recess $K^2$ thereof, as shown, and a suitable clamping-nut is provided, so as to adjust these sections to any desired angle and hold them to same, as will be understood. I prefer to use two of these leaves or plates, as shown; but it will be understood that one could be used, and in such case only one knife would be ground at a time, the adjacent edges of the next knife being afterward ground. The plate, being pivoted at its inner end, can be adjusted to any suitable angle; but I prefer to use two plates and pivot them on the same pin or otherwise, so that they turn on a common center, and I preferably arrange the pivot at the center and base of the table's recess, as shown.

The clamp N is provided with the clamping-points N', projected over the adjustable guide-supports M, and the base-plate $N^2$, constructed with slot $n$, through which the screw $n'$ extends from the table. The thumb-nut $n^2$ turns down on this screw and bears against the base-plate of the clamp, giving the said clamp the necessary holding-pressure, and permitting the adjustment of the same forward or back, the under shoulder, $N^2$, at the juncture of the arms and base-plate, serving as a guide for the back-bar of the knife, in connection with the adjustable stops L, before described.

In operation, the knife is placed on the table, with its back-bar clamped between the shoulder $N^2$ of the clamp, the support L, and the ledge $l^2$, formed across the face of the table, and it is arranged with the edges of two adjacent blades over the recess $K^2$, and the supports M, having been properly adjusted, rest close to the cutting-edge of the blade and support the same firmly, as will be understood. The table is then moved under the grinding-wheel, which is revolved in the manner described, and is pushed farther in until the blades are properly ground.

The functions of the several parts are, it is thought, fully set forth in the foregoing description, and a repetition seems unnecessary.

In grinding a harvester-knife it will be understood that the apex of the triangular space between the adjacent blades remains always the same and the cutting is done at the side, so that the guides or supporting-plates should be adjustable from a fixed pivotal point outward at their outer ends, to suit the varying angles of different knives.

Ordinarily the table is held and moved by the left hand and the drive-wheel is revolved by the right hand; but where it is desired to revolve the drive-wheel by the left hand and move the table by the right hand—as, for instance, in the case of a left-hand person—I simply remove the spindle and insert it from the left side, thereby securing the drive-wheel on the left side, and the journal-caps over shafts F' of the abraiding-wheel are removed, and the said wheel is reversed end for end, throwing its pinion into mesh with the drive-wheel, and the journal-caps are replaced, and the machine is again ready for use.

Having thus described my invention, what I claim, and desire to secure by Letters Patent, is—

1. In a machine for grinding harvester-knives, the combination of the standard, the swinging frame, and the spring having one end held against the standard and its opposite end bearing against the swinging frame, and the retaining-screw turning in a threaded socket, whereby the pressure on the frame may be varied, substantially as and for the purposes set forth.

2. The table adapted to support the harvester-knife, and provided with suitable bearings, $K^4$, and adjustable clamps $K^5$, in combination with the base and the rails secured thereon and adjustable laterally, substantially as and for the purposes set forth.

3. In a machine for grinding harvester-knives, the combination, with a table adapted to support the knife, of two pivoted leaves or supporting-plates having their outer or movable ends adjustable on a common center, substantially as set forth.

4. The combination, substantially as hereinbefore set forth, of the base, the rails mounted thereon, the stops mounted on said rails and slotted longitudinally, the retaining-screws having their shanks passed through and their heads bearing on opposite sides of said slots, whereby the stops may be adjusted, the abrading-wheel and the table moving on said rails, as and for the purposes specified.

5. In a harvester-knife grinder, the combination, substantially as hereinbefore set forth, of the standard, the swinging frame pivoted thereto and carrying the abrading-wheel, the post $A^2$, arranged in rear of the standard, and the retaining-screw adapted to be driven through the swinging frame into the head of the post when the swinging frame is thrown over thereon, substantially as and for the purposes specified.

6. The combination, in a sickle-grinding machine, of the standard having its top bar, $b^3$, bored horizontally to provide a bearing for the spindle, the swinging frame having the grinding-wheel F, and pinion $F^2$, supported in its outer end, and having its opposite end bifurcated, and provided with the bearings $c\ c$, embracing the standard bearing-bar $b^3$, the spindle passed through said bearings $b^3\ c\ c$, the operating-wheel journaled on said spindle in line and meshed with pinion $F^2$, and the clamping-screw $b^4$, turning through a tapped opening in the bearing-bar $b^3$ and bearing against the spindle, substantially as set forth.

7. In a sickle-grinding machine, the sickle-carrying table provided with a ledge or shoulder, $l^2$, and a central clamp, as N, and having the support or supports L arranged to one side of the clamp, and adjustable to and from the ledge or shoulder $l^2$, substantially as and for the purposes specified.

In testimony whereof I affix my signature in presence of two witnesses.

JAMES N. PARKER.

Witnesses:
S. WOLF,
P. B. TURPIN.